United States Patent [19]

Kupiec et al.

[11] 4,149,968

[45] Apr. 17, 1979

[54] METHOD OF CONVERTING HAZARDOUS INDUSTRIAL AND OTHER WASTES INTO AN INERT, NON-POLLUTING AND USEFUL SOIL-LIKE PRODUCT

[76] Inventors: Albert R. Kupiec, 523 N. Meadowcroft Dr.; E. Dennis Escher, 289 Casa Dr., both of Pittsburgh, Pa. 15241

[21] Appl. No.: 835,264

[22] Filed: Sep. 21, 1977

Related U.S. Application Data

[63] Continuation of Ser. No. 683,045, May 5, 1976, abandoned.

[51] Int. Cl.$^2$ .............................................. C02C 5/02
[52] U.S. Cl. ..................................... 210/28; 405/128; 210/59
[58] Field of Search ................ 61/35; 106/71, 76, 89; 210/28, 42 R, 52, 53, 55, 59, 66, 170, 61

[56] References Cited

U.S. PATENT DOCUMENTS

| | | | |
|---|---|---|---|
| 3,837,872 | 9/1974 | Conner | 106/76 |
| 3,841,102 | 10/1974 | Cinner et al. | 61/35 |
| 3,962,080 | 6/1976 | Dulin et al. | 210/59 |
| 3,980,558 | 9/1976 | Thompson | 61/35 |

*Primary Examiner*—Charles N. Hart
*Assistant Examiner*—Ivars Cintins
*Attorney, Agent, or Firm*—William J. Ruano

[57] ABSTRACT

When bentonite clays and portland cements are mixed with aqueous solutions or with mixtures containing polluting materials, a solid mass is formed. The quantities of bentonite and cement control the consolidation of materials and govern physical factors, such as the hardness and the chemical characteristics of the resultant material. This resulting product is chemically and physically stable; a solidified product which is almost completely insoluble in water, and in which, pollutants are encapsulated in the matrix so that the waste material is rendered non-polluting and fit for ultimate disposal.

5 Claims, No Drawings

METHOD OF CONVERTING HAZARDOUS INDUSTRIAL AND OTHER WASTES INTO AN INERT, NON-POLLUTING AND USEFUL SOIL-LIKE PRODUCT

This is a continuation of application Ser. No. 683,045, filed May 5, 1976, now abandoned.

This invention relates to a process for converting hazardous wastes into an inert non-polluting material. The process will treat waste streams which for some economic or hazardous reason cannot be disposed of in any other manner. The term hazardous wastes includes any type of industrial wastewater, sludge, or any other waste material generated by any industrial process. This includes pickling acids, spent caustic solutions, plating wastes, sludges resulting from the neutralization, oxidation, and/or precipitation of heavy metal wastes, sludges from the chemical or physical treatment of waste products, refinery wastes, sulfur dioxide removal sludges, sewerage sludges, water treatment plant sludges, tannery wastes, organic manufacturing wastes, paint and pigment wastes, polymer production wastes, and any other wastes, liquid or solid, resulting from any manufacturing process.

Attempts have been made in the past to convert wastes into non-polluting material, such as the use of an aqueous solution of an alkali metal silicate mixed with the waste material and a silicate setting agent, as described in U.S. Pat. No. 3,837,872, dated Sept. 24, 1974. However, certain outstanding disadvantages have been found in such a solidification method,—namely, such silicates are soluble in water and the soluble salts could leach out and pollute. Moreover, the sludge upon drying, dehydrates the silica gel which will not reabsorb water to any appreciable degree; instead, it dries into a powdery high surface area dust which can be blown by the wind. Also it has a high pH value, and a greater amount of reagent is needed for the above process, therefore involving a greater expense.

The object of the present invention is to overcome the above-named disadvantages by providing a process for converting hazardous wastes, both liquids and sludges or slurries, into an inert, non-polluting material, wherein an insoluble rather than a soluble material is used and wherein the ions do not leach out to any appreciable extent, therefore will not pollute the water,—also wherein the resulting inert product is spongy and will reabsorb water, and wherein the pH value is relatively low, about 8 to 9, with the formation of insoluble compounds, good resulting sludge, therefore is not dangerous to handle—also wherein only about 5% by weight per volume is needed for the conversion process and wherein the materials used are relatively inexpensive, therefore cutting costs by 30% or more,—also wherein the resultant product greatly simulates soil in both color and physical characteristics and may be actually used as soil for growing vegetation, including grass, therefore, in effect, recycling soil to natural and useful condition to enable grass to be grown thereon, thus avoiding marring of the natural appearance of the landscape bearing such wastes.

The principal material used in the present invention is bentonite, which is a colloidal native hydrated aluminum silicate (clay) found in the midwest of the U.S.A. and Canada. The colloid is from yellowish-white to almost pale brown. It forms highly viscous suspensions or gels with not less than ten times its weight of water.

A suitable range for the conversion mixture of the present invention is $\frac{1}{4}$ to 30% bentonite, $\frac{1}{4}$ to 50% Portland Cement and the balance, waste material, (by weight).

Outstanding benefits of this process are the abilities to use treated toxic wastes for subterranean disposal, for fill material to improve undesirable land areas, or for the reclamation and revegetation of strip mine areas. The process will produce the above results in a manner which is safe and desirable from all environmental aspects.

The concentrations of bentonite, Portland cement, and wastewater or sludge are highly dependent upon the type of material being treated. Based upon the eventual use and disposal of the treated wastes, the mixture can be prepared in a manner which will suit the ultimate disposal. If the material is to be land fill, less reagents are required than if the material is to be used as a base for a building site.

Interactions between the setting agents and the industrial wastes are extremely complex with ion exchange reactions taking place on the bentonite clay and various hydration and setting reactions taking place in the cement matrix.

The purpose of this invention is to provide a simple, economical method of treating hazardous wastes to produce an inert material that will dispose of these wastes in an environmentally acceptable fashion at a minimum of cost by the addition of only a small volume of treatment chemicals.

The invention uses two materials, which after wetting and aging, can absorb and contain hazardous wastes with a minimal amount of leaching to the environment and contain only minor quantities of dissolvable material. This invention does not use any highly ionized materials which, in themselves, could create an environmental hazard.

The invention has unique chemical characteristics and encapsulates hazardous materials rendering them nearly inert and non-leachable. This process will encapsulate organic and/or inorganic waste materials and render them fit for disposal to the environment.

The inert product of this process is a clay-like material and has the ability to encapsulate hazardous wastes in a cement-bentonite matrix, and produce a material that has the ability to retain and reabsorb moisture. The produced inert solid has the appearance of soil and can be easily mistaken for a clay varying in color from a red to a gray or black-brown.

The treated waste material has the ability to support vegetation. Grasses grown on solidified waste materials resulted in vegetation of a luxurious green. These treated industrial wastes provide excellent media for grass growth because of their high ability to hold moisture, and the lack of many ions which would destroy plant life.

A.

A.

The reaction of bentonite clay with water results in the bentonite clay exhibiting an affinity for water and absorbing 12 to 15 times its volume in water. Bentonite clays exhibit basic ion exchange properties in water solutions, and quite readily gives up sodium and potassium ions in the adsorption of metallic ions. The result of this property of bentonite makes it highly desirable as an inorganic ion exchange media. Also, bentonite clays enter very strongly into base exchange with various basic organics, thereby extracting them from solutions of their salts. When bentonite clay is mixed with one part bentonite to ten parts of water by volume, it creates a gelatinous ion exchange medium which exhibits the above mentioned properties. The avid absorption of bentonite of other substances, both inorganic and organic, is due to the great surface area of the bentonite clay, the spongy structure, mobility, the basic exchange, and the strong negative polarity of the material.

Portland cement undergoes several reactions with water in setting. These reactions begin with the hydrolysis of certain chemicals in the Portland cement and continue through hydration and other reactions. By combining Portland cement with a mixture of industrial wastes and bentonite clays, a physical stability is acquired, which has the ability to entrap and bind all contained waste materials.

B.

By combining the bentonite clay, cement, and industrial wastes in an alkaline pH range, there are chemical reactions that occur with metal salts to form insoluble metal hydroxides which are permanently coated or encapsulated into the matrix. Many organic salts and acids can be converted to the sodium derivative and these can be avidly trapped into the matrix to form insoluble compounds.

By selectively varying the ratio of reagents, any desirable consistency can be obtained from a soft clay to a dense, hard rock-like material. In combining bentonite and Portland cements, to induce a solidified system, only small quantities of bentonite and Portland cement are required which is another outstanding feature, namely economy, of the present invention. In most instances, the total percent by weight of fixation reagents to wastes is less than 10% and often times is in the range of 1% to 6%. Normal reaction time for the bentonite clay and cement mixtures range from 30 minutes to five hours, depending upon the consistencies of the industrial waste being treated. The material after treatment is still fluid, and it is normally pumped from the treatment site to a holding pond to solidify and then removed with earth moving equipment or left in place.

EXAMPLE NO. 1

Industrial waste materials resulting from the pickling of steel were brought to a central disposal area and treated by lime neutralization. The resulting sludge was then treated by the process of the present invention, with the resulting product being a clay-like material which totally absorbed, chemically bound, and encapsulated all of the water contained in the sludge. The process rendered the sludge environmentally acceptable with a minimal amount of leachate emanating from this sludge. Grasses were grown on the resulting product without any additional treatment, with outstanding success. The resulting solidified mass had a clay-like appearance, and when cultivated with plant grass, the material had the appearance of a rich loam soil.

The herein described procedure adequately treated this toxic waste sludge and produced a material which is truly environmentally acceptable for use in a landfill or as a fill to reclaim environmentally deteriorated land. More specifically, the raw waste sample had the following chemical characteristics: a pH of 0.1; hot acidity of 195,200 mg/l; total iron concentration of 28,400 mg/l; sulfate concentration of 98,000 mg/l; manganese concentration of 184 mg/l; chromium concentration of 400 mg/l; nickel concentration of 760 mg/l; copper concentration of 102 mg/l; zinc concentration of 16,000 mg/l; chloride concentration of 190,000 mg/l; fluoride concentration of 210 mg/l; and a total dissolved solids, 210,700 mg/l.

This material was neutralized with slaked calcium oxide to produce a neutralized sludge which had the following chemical characteristics: a pH of 12.0; alkalinity of 5,000 mg/l; suspended solids of 91,400 mg/l; calcium, 24,300 mg/l. This material was treated with various concentrations of Portland cement and bentonite: (all values are expressed in percent by weight) 2% bentonite, 15%, 18% and 20% Portland; 3% bentonite and 6%, 9%, 12%, 15%, 18%, and 20% Portland cement; 4% bentonite with 6%, 9%, 12%, 15%, 18%, 20%, and 24% Portland cement. The samples were solidified and penetrations ranged from a maximum greater than 5 kilograms per square centimeter to approximately 0.8 kilograms per square centimeter. The material closely resembled a clay and was impermeable to water.

A field study was then established using various ratios of bentonite and clay mixtures. Test cells were constructed to study the leaching characteristics and the following reagents were added to the sludge: (3:6 represents 3% by weight of bentonite and 6% by weight of Portland cement) 3:6, 3:9, 3:12, 4:6, 4:9, 4:12, 1.4:4, 2.2:6, 3.7:2. Readings were taken on the samples and the penetrations were all in the range greater than 2½ kilograms per square centimeter. The material was clay-like in appearance and did not permit water penetration. Leachate analyses of these test cells were obtained, and the data shows that the material is relatively leach free and complexes all heavy metals, and retains sulfates, and chlorides. Grass was then grown on this treated material and it fluorished. Additional investigations were conducted using bentonite clay in ¼ to 30% by weight mixes, and Portland cement in ¼ to 50% by weight mixes, and was found that the hardness of the solidified sludge was a function of the total solids of the mixed material, and of the concentration of reagents added to the system.

EXAMPLE NO. 2

Numerous samples of organic waste products were subjected to the process of the present invention under simulated treatment conditions. These were treated with bentonite and Portland cement. The sludges produced by this process adsorbed the organic waste materials in a bentonite cement matrix and also produced a sludge which was clay-like in consistency.

The organic materials contained in the waste stream were adequately treated using this system, and no evidence of their presence was noted after the sludges had been treated with the Portland cement-bentonite mixture. More specifically, several samples of organic wastes such as oil tank bottoms, organic sludge resulting from paint manufacturing, and oils and greases were subjected to the solidification technique. The ratios of bentonite and Portland cement were varied until a dense clay-like material was formed. It was determined that, by weight in all instances, no more than 30% bentonite and 50% Portland cement were required to solidify the wastes. Depending upon the solids, and the water concentration, solidifications were performed that used a minimum of reagents. For example, a paint sludge required 2% bentonite and 4% Portland cement to create a solidified product that was capable of withstanding 1.5 kg/sq. cm bearing strength. Once again, it was noted that the product was more highly colored and was highly dependent upon the color of the waste materials. In all instances, dense clay-like materials were formed that were impermeable and relatively free from leaching.

EXAMPLE NO. 3

Samples of the sludge resulting from acid mine drainage treatment were solidified using the herein described process. The resulting sludge had a clay-like consistency, was orange in nature, and complexed all of the metals present in the mine drainage sludge. The leachate characteristics of the neutralized sludge were extremely good with the leachate emanating from the solidified material containing no parameters that would adversely affect water quality. This sludge was successfully treated and produced an environmentally acceptable waste product. More specifically, samples of effluent of clarifier sludge were subjected to the process and satisfactory solidification occurred in the range, by weight of 2% bentonite and 4% Portland cement. The color of the sludge produced in this instance was yellow, red and closely resembled the original waste product. The materials were solidified under various concentrations ranging from 1% bentonite to 20% Portland cement, to 10% bentonite and 20% Portland cement, by weight.

EXAMPLE NO. 4

Samples of the sludges resulting from fly ash and sulfur dioxide scrubbing were treated and produced a material that was of a clay-like consistency and black in color. The leachate characteristics of the neutralized sludges were extremely good and contained no parameters that would adversely affect water quality. More specifically, test ratios of bentonite to Portland cement in the range of ½:1, by weight 1:2, 1:3, 1½:3, 2:4, and 3:6 were used on a clarifier effluent resulting from the sulfur dioxide scrubbing process at a local generating station. The material had a pH of 5.5, a specific gravity of 1.43, and a moisture content of 49%. The various test ratios produced a product that was very soft at the lower concentrations to a product that was rock hard at 3.6. The bearing strength of the ½:1, 1:2, and 1:3 mixtures was less than 0.25 kilograms per square centimeter, or tons/ft$^2$, while the 3:6 ratio provided 3.5 kilograms per square centimeter. Additional samples of sulfur dioxide scrubbing sludges were obtained and treated using bentonite and Portland cement for solidification reagents. The test ratios used in this study were 1.25%:2.5%, 1.25%:3.75%, 2.5%:7.5%, 3.75%:7.5%, 3.75%:11.25%, 6.25%:11.25%. Fifty grams of fly ash was added to 200 milliliters of sludge which had a specific gravity of 1.35, a density of 11.27 pounds per gallon, and a moisture of 56%. To this the bentonite and Portland cement were added until fixation took place. After a period of one week, the penetrometer readings of tons/ft$^2$ ranged from 7.92 to greater than 50.4. After two weeks aging, the results showed 190 to greater than 50.4. After four weeks, the results showed the 1.25%:2.5% showing a bearing strength of 25.2 tons/ft$^2$. The 1.25%:3.75% showed a bearing capacity of 460 per square centimeter. All of the other results showed bearing capacities greater than 50.4. The solidified material had a black color and the consistency varied from a watery clay to a silty clay structure.

Thus it will be seen that we have provided an efficient and very inexpensive method of converting hazardous industrial wastes into an inert, non-polluting and very useful soil-like product having the characteristics of ordinary soil so as to permit growing of grass or vegetation thereon and thus greatly improving the environment; furthermore we have provided a resulting product which is chemically and physically stable and almost completely insoluble in water.

While we have illustrated and described several embodiments of our invention, it will be understood that these are by way of illustration only and that various changes and modifications are contemplated in our invention, within the scope of the following claims.

We claim:

1. The method of converting a liquid-containing, polluting waste, having metallic ions, into an inert, non-polluting material, comprising adding and mixing a neutralizing agent, to adjust the pH value of said waste to between a value greater than 6 and up to about 11, adding and mixing with said waste bentonite clay having a weight from ¼% to 30% of the weight of said waste, and thereafter adding and mixing, with said mixture, portland cement having a weight between ¼ to 50% of the weight of the waste, the reaction time being from about ½ to about 5 hours, said bentonite clay exhibiting basic ion exchange properties in the treated waste solution and quite readily exchanging sodium and potassium ions in the adsorption of said metallic ions, resulting in a gelatinous ion exchange type medium which forms insoluble metal hydroxides, and thereby removes said metallic ions from solution and encapsulates the polluting material in the bentonite cement matrix and converts the waste into chemically and physically stable solid particles physically simulating soil which is substantially insoluble in water but which is spongy so as to reabsorb water without leaching out ions to a harmful extent.

2. The method recited in claim 1 wherein said pH is at an optimum value of 8 to 9.

3. The method recited in claim 2 wherein said bentonite is in the optimum range of about ¼% to 10% and said Portland cement is in the optimum range of about ¼% to 25% of the weight of said waste.

4. The method recited in claim 1 wherein less than 5% of the weight of said bentonite clay and portland cement, relative to the weight of said waste, is utilized for said conversion.

5. The method recited in claim 1 wherein the polluting waste is a sludge resulting from processes selected from the group consisting of pickling, sewerage sludge, sulfur dioxide removal system, mining sludges, plating, neutralization, oxidation, precipitation of heavy metals, physical chemical treatment processes, tannery operations, organic manufacturing, paint and pigment manufacturing and polymer manufacturing.

* * * * *